March 29, 1966  K. L. CRABTREE  3,243,096
PULP PARTITION MOLDING
Original Filed June 4, 1964  4 Sheets-Sheet 1
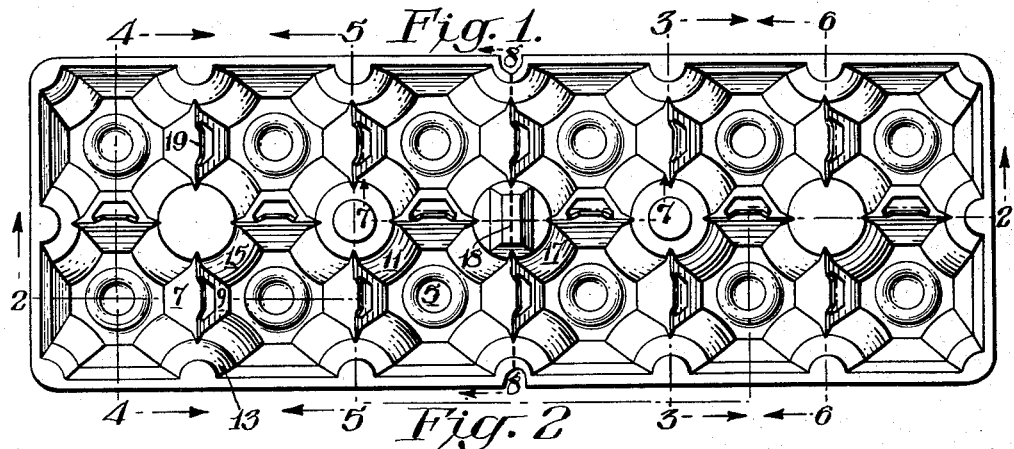
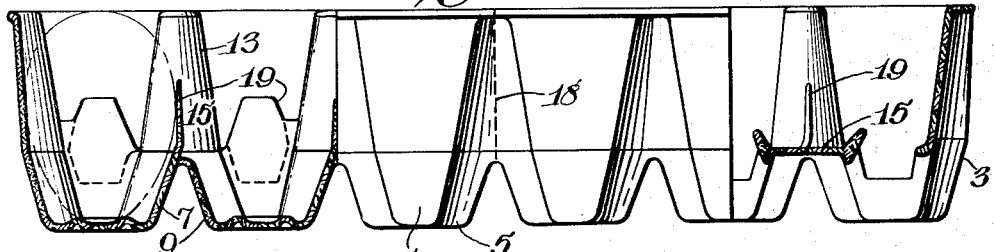
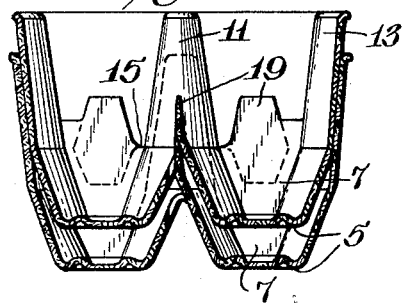
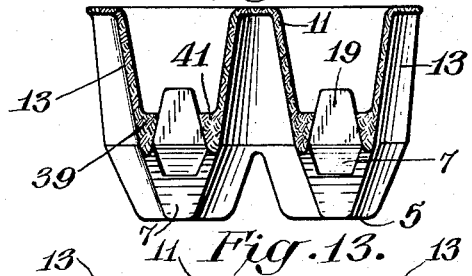
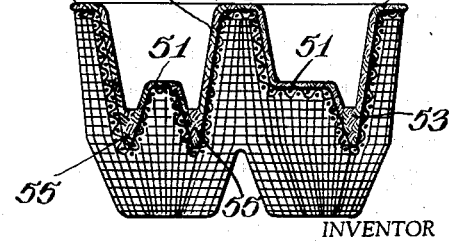
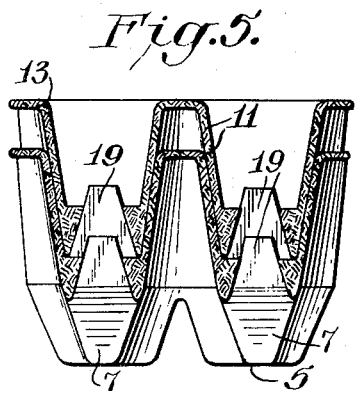
INVENTOR
Kenneth L. Crabtree
BY Connolly and Hutz
ATTORNEYS March 29, 1966  K. L. CRABTREE  3,243,096
PULP PARTITION MOLDING Original Filed June 4, 1964  4 Sheets-Sheet 2

INVENTOR
Kenneth L. Crabtree
BY Connolly and Hutz
ATTORNEYS

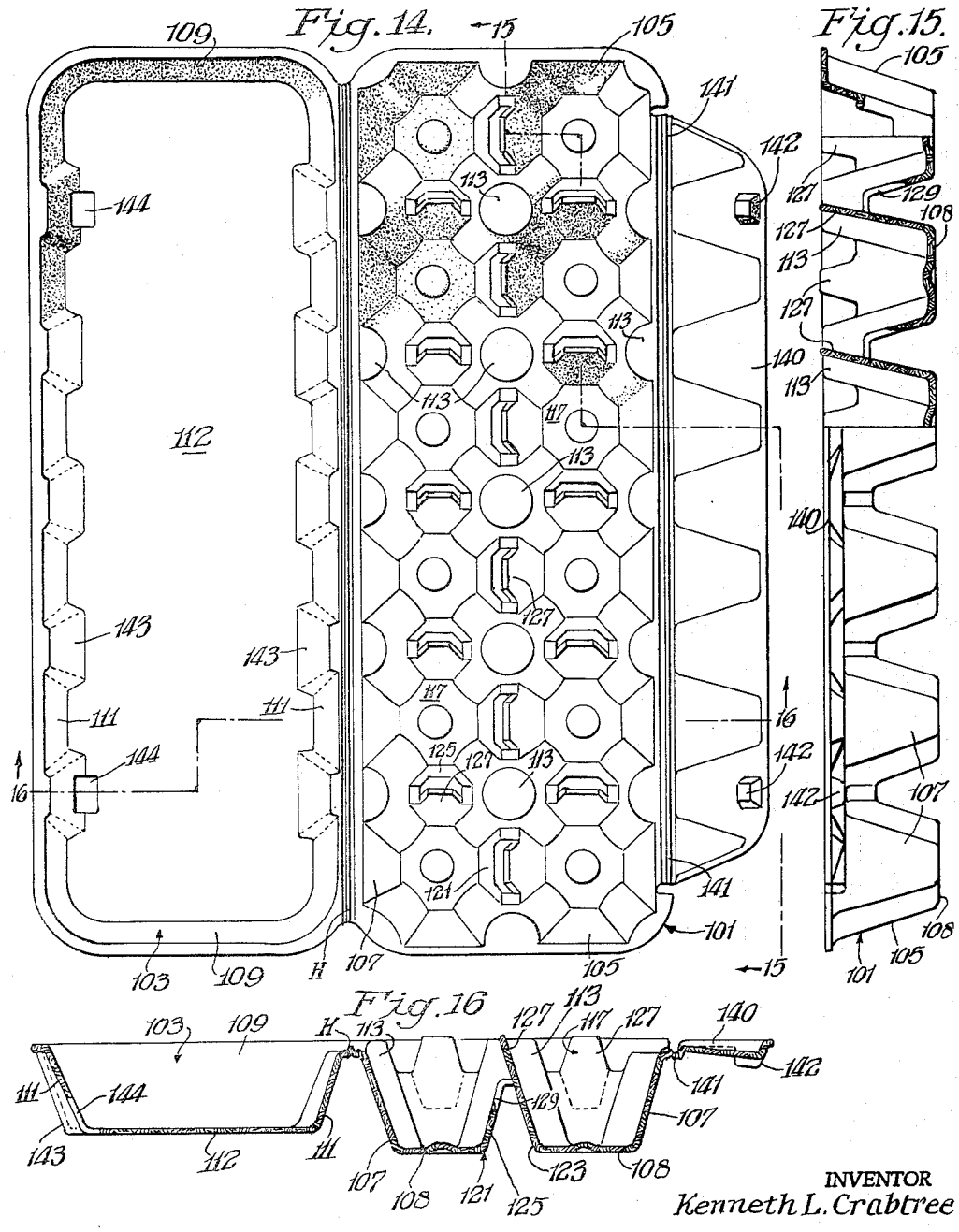

March 29, 1966     K. L. CRABTREE     3,243,096
PULP PARTITION MOLDING
Original Filed June 4, 1964     4 Sheets-Sheet 4
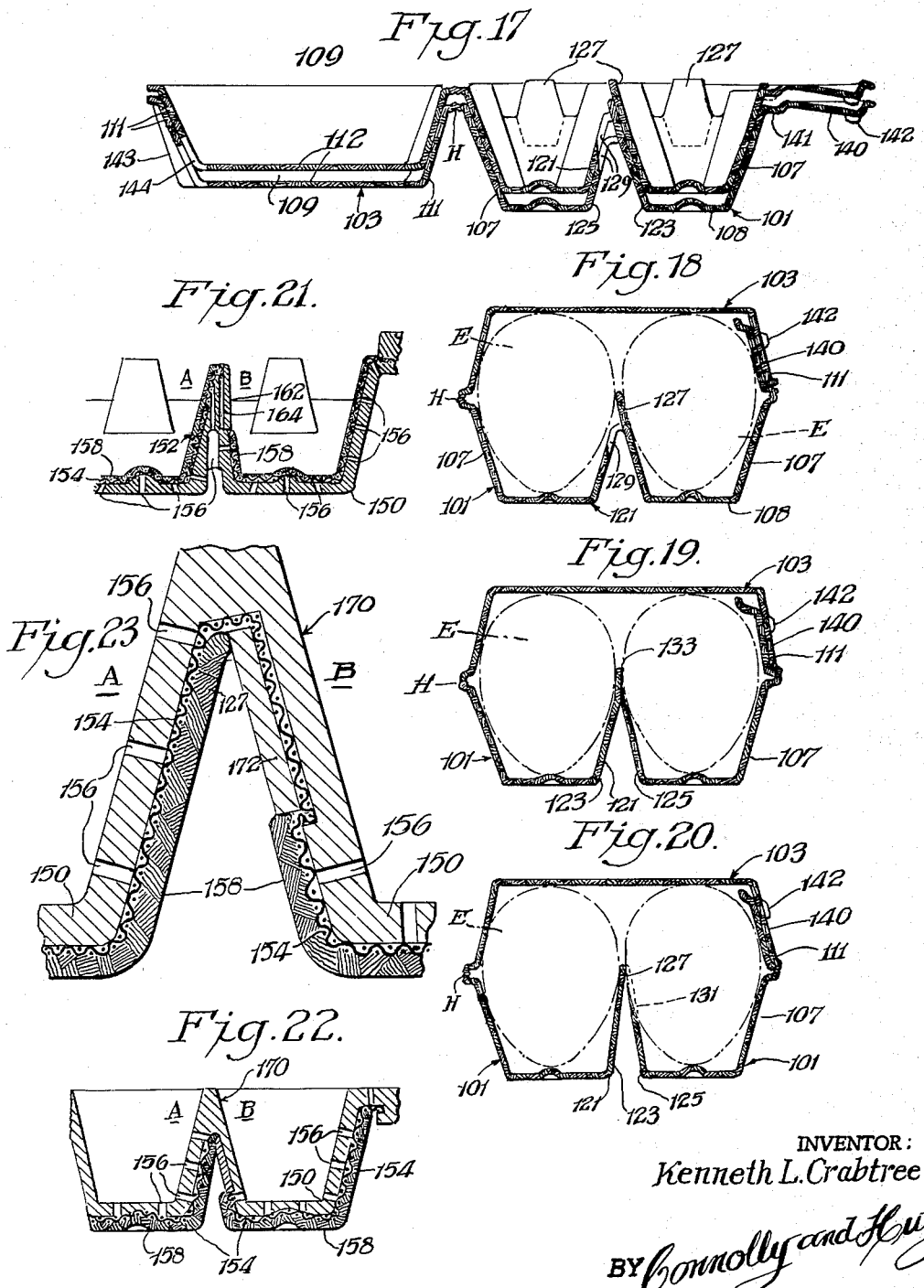
INVENTOR:
Kenneth L. Crabtree
BY Connolly and Hutz
ATTORNEYS

United States Patent Office 3,243,096
Patented Mar. 29, 1966

3,243,096
PULP PARTITION MOLDING
Kenneth L. Crabtree, Fairfield, Maine, assignor to Keyes Fibre Company, Waterville, Maine, a corporation of Maine
Original application June 4, 1964, Ser. No. 374,878. Divided and this application Oct. 21, 1965, Ser. No. 499,515
25 Claims. (Cl. 229—2.5)

This is a division of this inventor's pending application S.N. 374,878 filed June 4, 1964 for Pulp Partition Molding which in turn is a continuation-in-part of this inventor's co-pending and now abandoned application S.N. 285,755 filed June 5, 1963 for Integrally Molded Container and of his copending and now abandoned application S.N. 834,759 filed August 19, 1959 for Egg Carton.

The present invention relates to molding partition structure of pulp or other suitable synthetic plastic material, and more particularly to single thickness upstanding wall structure useful for cushioning barriers as well as multiple thickness gusset formations useful for anti-jamming and strengthening features, separately and in combination.

The single thickness upstanding wall structure of this invention, regardless of the method or apparatus employed to form such a product, provides a long-sought answer to the problem of properly cushioning articles, such as eggs in a pocketed container, against lateral forces with a minimum usage of material and space.

It is an object of the present invention to provide such upstanding wall or partition structure to attain the highly satisfactory cushioning with desirable economy which does not depend upon cutting, folding, after-pressing or the like to form the single thickness wall structure, the latter for instance being known from Patent 1,922,145 issued August 15, 1933 and also shown in Patent 3,199,758 dated August 10, 1965. Moreover, the invention further may encompass multiple thickness gusset formations highly satisfatcory for anti-jamming purposes, either alone or in combination with the single thickness partitions.

In the art of molding containers of pulp, synthetic plastics and other materials, it is generally not possible to mold wall structure in absolutely vertical planes, that is, in planes absolutely parallel with the direction of article-die separation, since it would be almost impossible to remove such an article from the forming die generally employed. It is therefore necessary to construct side walls of such articles with a greater or lesser degree of inclination to the direction of article-die separation, the extent thereof being at least partially determined by the vertical height of the wall in question, and ordinarily being on the order of 5° to 20° angle to the direction of article-die separation. This is particularly true of containers which include a plurality of cells adapted to support objects therein, the common wall structure of adjacent cells taking the form of ribs and comprising an upwardly extending and convergingly sloping pair of wall members, which may be connected to other rib or side walls such as posts at either end thereof. Examples of such containers include trays and cartons which are designed to support objects such as eggs, fruits, light bulbs and other articles therein.

The present invention includes improved cell wall structure of unitary molded thickness which extends upwardly to a height which is adequate to prevent articles in adjacent cells from contacting one another across the top of the upwardly extending and convergingly sloping pair of cell wall members. This is a particularly important feature in trays or cartons of the type adapted to support a plurality of relatively fragile articles such as eggs, fruits, light bulbs, and other articles.

On shipping or storing pocketed containers of the above type, they are nested one within the other in order to save space. In the nested relationship, a large number of containers are stacked so that the interior of the pockets of each lower container snugly receive the exterior of the pockets of each next adjacent upper container while the interior of the posts of an upper container snugly enclose the exterior of the corresponding posts of the lower container. Absent the use of suitable means for preventing jamming or wedging together, it is virtually impossible to separate containers of the type in question without either distorting or tearing the same.

One of the novel features of the present invention is based on the discovery that it is possible to integrally mold gusset means which not only serve to structurally strengthen the containers in question but also serve to prevent jamming when stacking like containers one within the other. Each integrally molded gusset means extends downwardly and joins the upper regions of the ends of a pair of cell wall members to each other to provide structure of a vertical height of multiple thickness substantially greater than unitary molded thickness. By "unitary molded thickness" is meant the thickness of container structure attained by usual molding techniques. Such molding techniques include depositing cellulosic pulp from a slurry by generally uniform suction on a wire screen which is formed to represent either the interior or exterior shape of the desired articles.

The aforesaid gusset means, by virtue of a vertical (i.e. direction of article-die separation) height substantially greater than unitary molded thickness, serve to space the stacked containers a sufficient distance apart to avoid jamming while not appreciably increasing the overall stacking height of the containers. Additionally, these gusset means increase the strength of the containers of the present invention at critical points. This is a particularly important feature when the associated rib wall structure corresponds to the preferred embodiment of the present invention or is relatively high as compared to the overall height of the container since it counteracts bending forces which might otherwise tear the container in areas adjacent the upper regions of the rib structure.

It will be appreciated that the gusset means of the present invention is not only positioned in the container in such a manner that it avoids interference with article storage capacity but also affords the aforesaid means for preventing jamming as well as enhanced structural strength.

Another novel feature of the present invention is based on the discovery that the above discussed single thickness partitions and the above discussed multiple thickness gussets may be directly molded in companion fashion to provide a superior rib structure in a single molding operation which includes the benefits of both formations.

Other objects and advantages of the present invention will become apparent to one skilled in the art from a reading of the following description in conjunction with the accompanying drawings wherein similar reference characters refer to similar parts, and in which:

FIG. 1 is a top plan view of one embodiment of egg carton of the present invention;
FIG. 2 is a view taken along the line 2—2 of FIG. 1;
FIG. 3 is a view taken along the line 3—3 of FIG. 1;
FIG. 4 is a view of nested containers of the embodiment of FIG. 1 taken along the line 4—4 thereof;
FIG. 5 is a view of nested containers of the embodiment of FIG. 1 taken along the line 5—5 thereof;
FIG. 6 is a view taken along the line 6—6 of FIG. 1;
FIG. 7 is a view taken along the line 7—7 of FIG. 1;
FIG. 8 is a view taken along the line 8—8 of FIG. 1;

FIG. 13 is a cross-sectional view of a forming die used for forming the alternative embodiments of FIG. 12 by suction deposition of pulp from an aqueous slurry of pulp;

FIG. 14 is a top view of another type of egg carton;

FIG. 15 is a side view partially in section along line 15—15 of the carton of FIG. 14;

FIG. 16 is a cross-section of the carton of FIG. 14 along line 16—16;

FIG. 17 is a section similar to that of FIG. 16 of a plurality of cartons in nested arrangement;

FIG. 18 is a sectional detail along line 16—16 of the carton of FIG. 14 but with the cover thereof in closed position;

FIG. 19 is a sectional detail similar to that of FIG. 18 showing another embodiment of the carton;

FIG. 20 is a sectional detail similar to that of FIG. 18 of still another embodiment of the carton;

FIG. 21 is a schematic sectional detail showing a portion of the mold used in forming the carton;

FIG. 22 is a sectional detail of another embodiment of the mold used in forming the carton; and FIG. 23 is an enlarged sectional detail of a portion of the mold of FIG. 22.

Figure 6:
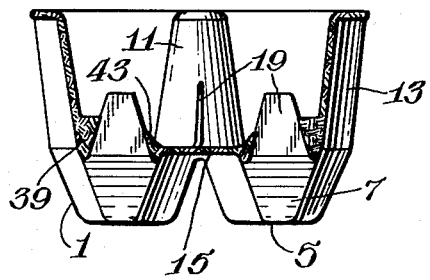
Figure 7:
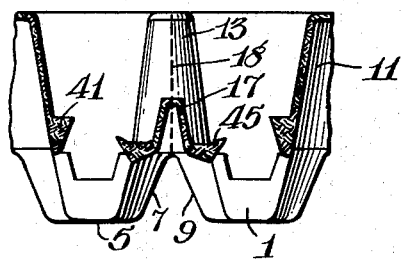
Figure 8:
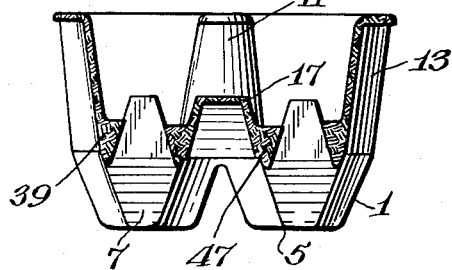

With reference to the drawings, the embodiment of the container of the present invention as illustrated in FIGS. 1–8 will now be described in detail. As seen best in FIGS. 1 and 2 of the drawings, the container comprises side walls 1, end walls 3, and a bottom portion generally indicated by reference numeral 5. As seen in FIG. 1, E represents the phantom outline of an egg packaged in one cell of the container, the side and end walls 1 and 3 thereof preferably being of such a height that they extend to at least the top end of an egg E or any other similarly shaped article packaged therein.

This container is preferably formed of a material which is capable of being molded as a single unit, i.e., integrally molded. Although fiber pulp is particularly satisfactory for this purpose, other suitable materials may be used such as light, strong plastic which may be molded as a one-piece unit between mating male and female dies or in other conventional dies.

The container of FIG. 1 is divided into a plurality of cells, the structure between a pair of adjacent cells comprising an upwardly extending and convergingly sloping pair of cell wall members 7 and 9. Each pair of wall members is joined to the bottom wall 5 and is arranged in either a transverse or longitudinally extending direction. A plurality of spaced posts 11, 13, 15 and 17 extend upwardly from the bottom wall 5. Posts 11, as shown, are full posts of a height corresponding substantially to the height of side and end walls 1 and 3. Posts 13 are half-posts arranged along the side and end walls and extending upwardly to substantially the same height as these walls. Posts 15 are full posts of substantially reduced height, the longitudinally extending center row of posts preferably including an odd number of posts with the even numbered posts therein being of such reduced height to facilitate article removal. Post 17, also of reduced height and the central post of the longitudinally extending center row of posts is of special design for the purpose of permitting transverse division of the container into two halves along score line 18, the resulting halves of central post 17 being shaped to retain objects within adjacent cells in upright position.

As shown, cell wall members 7 and 9 extend between and connect adjacent post member pairs 11, 13; 11, 15; 11, 17; 13, 15 and 13, 17, to each other. However, and as those skilled in the art will appreciate from the following description, cell structure adequate for supporting various objects could be provided without the use of any diagonally arranged posts, i.e., the pairs of cell wall members 7, 9 may intercept one another in the absence of post structure 11, 15 and 17 and may intercept the side and end walls 1 and 3 in the absence of half-posts 13. Thus, FIG. 1 merely illustrates a preferred embodiment of the present invention since the container thereof may take many other forms while utilizing the important molded gussets means and associated cell wall structure of the present invention.

The structure of the pair of wall members 7 and 9, as illustrated by the embodiment of FIG. 1, includes an arrangement which is free of means interconnecting one wall to the other in the central portion of the length thereof. Preferably, wall member 7 is of a height substantially less than the theoretical point of merger of the upwardly extending and convergingly sloping walls 7 and 9 and wall member 9 is of a substantially greater height by virtue of a tabular extension element 19, extension element 19 preferably extending upwardly to a height sufficiently great to provide means preventing articles in adjacent cells from contacting each other.

Figure 9:
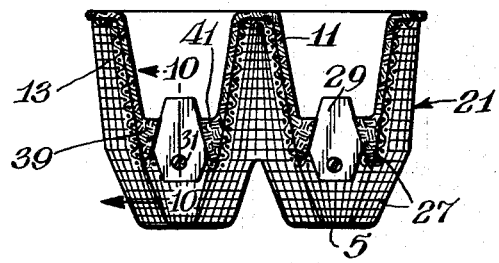
FIG. 9 is a cross-sectional view of a typical forming die used for forming the embodiment of FIG. 1 by suction deposition from an aqueous slurry of pulp.
Figure 10:
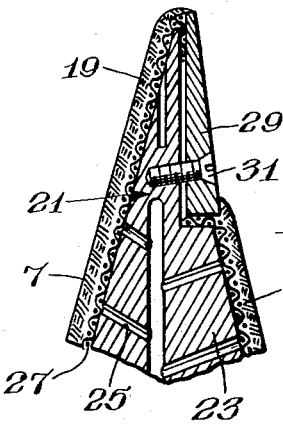
FIG. 10 is an enlarged cross-sectional view taken along the line 10—10 of FIG. 9.
Figure 11:
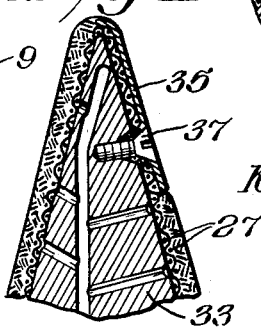
FIG. 11 is a view similar to FIG. 10 of a modified forming die.

A preferred means for forming tabular extension element 19 is shown in FIGS. 9 and 10 which illustrate a female mold for forming this structure as well as adjacent structure. The essential portion of the mold 21 of these figures includes a vertically extending base portion 23 which tapers upwardly to support the means used to form walls 7 and 9 and tabular extension 19. Base portion 23 includes ports 25 connected, in a well known manner, to a vacuum suction source for the purpose of applying suction to screening 27 arranged thereover and thereby deposit pulp fibers from an aqueous slurry. The unbridged central portion of the pair of walls 7 and 9 is formed by blanking off screening 27 with a solid member 29 fastened to base 23 via countersunk screw 31, the free ends of screening 27 adjacent member 29 being locked into position between members 23 and 29. In lieu of the arrangement of FIGS. 9 and 10, and as shown by FIG. 11, screening 27 may extend completely over a base element 33 and the desired portion thereof blanked off by means of a relatively thin non-foraminous element 35 which may be made of sheet metal or other suitable material. This element is held in position by a countersunk screw member 37.

Elements 29 and 35 determine the size and shape of the opening defining the unbridged portion of the pair of wall members 7 and 9. Preferably this shape is such that it permits entry of a tab portion 19 into the overlying opening of another like container placed above in stacked relation. FIGURE 4 well illustrates such an opening arrangement which permits stacking irrespective of the vertical height of tab 19.

Figure 12:
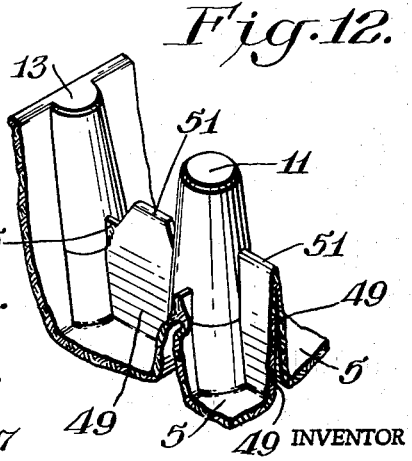
FIG. 12 is a perspective view illustrating alternative embodiments of the present invention.

With continued reference to the embodiment of FIG. 1, the gusset means of the present invention may take many different forms as is illustrated best in FIGS. 3 and 6–8 inclusive by reference numerals 39, 41, 43, 45 and 47. Each of these integrally molded gusset means extend downwardly so that the lower surfaces as shown in FIG. 3 are shaped in cross-sectional view longitudinally of a rib or partition structure like an upright "U" or "V," and join the upper regions of the ends of one pair of side wall members 7 and 9 to each other at, in the preferred embodiment, one of the post connecting ends thereof so that the upper surfaces of the gussets as shown in the lower left of FIG. 12 are shaped in cross-sectional view transverse to the rib structure like an inverted "U" or "V." This is useful to provide structure of a vertical height substantially greater than unitary molded thickness. As will be appreciated when considering FIGS. 4 and 5, such gusset means, in view of its vertical height of substantially greater than unitary molded thickness, is useful in preventing jamming when stacking like containers one within the other. Thus, the walls, posts and other vertically extending structure of the container which would normally fit snugly within one another are spaced apart and as a result there are no substantial frictional forces which must be overcome when separating stacked containers. Furthermore, such gusset means serve to increase the structural strength of the present containers at critical areas thereof without interfering with their storage capacity.

The gusset means of the present invention may be formed by a variety of methods. The preferred method for use in the art of molding pulp by suction deposition on a wire or other screening depends on the discovery that there is a tendency for pulp fibers to agglomerate in interfelted fashion across a relatively narrow gap between wire formation members defining the sides of two rather steeply rising adjacent elements of a molded article. Thus, and with further reference to FIG. 9, gusset means 39 and 41 are formed in the narrow slots represented by their cross-sectional areas and extending between the screening 27 used to form wall members 7 and 9 and the adjacent screening used to form adjacent half-post 13 and full post 11. Gusset means 43, 45 and 47 are formed in similar fashion. In general, the vertical height of the gusset means which may be obtained by this method of formation depends on the relative angular divergence of the two upwardly and outwardly extending members which define the slot which is filled by the pulp fibers. Employing typical aqueous slurry make-ups, customary meshes for screening and the usual degree of vacuum suction, it is possible to obtain gusset means having an upper horizontal dimension of up to the order of ⅜ of an inch or more.

Although a preferred embodiment of the present invention has included tabular extension 29 for the purpose of affording a molded thickness barrier of single molded thickness between articles packaged in adjacent cells, an equally effective cell wall structure for certain purposes is illustrated in FIG. 12. A typical mold for forming the structure of FIG. 12 is shown in FIG. 13. Each of the wall members 49, 49 of FIG. 12 are integrally joined at their tops by ridge bridging means 51 of substantially unitary molded thickness. As shown to the right of post 11 (FIGS. 12 and 13), no gusset means is associated with the point of merger of bridging means 51 and post 11. However, gusset means 53 is associated with the half-post 13 (right-hand side of FIG. 13). With reference to the left-hand side of FIGS. 12 and 13, gusset means 55 are provided on either side of bridging means 50. It is believed apparent from FIGS. 12 and 13 that the difference in the mold herein used and that used in the formation of the gusset means of the embodiment of FIG. 1 is the omission of blank-off element 35 of FIG. 11. Additionally, it will be appreciated for reasons explained above in connection with the embodiment of FIG. 1, that post structure 11 could be omitted. Similarly, plain side wall structure could be substituted for half-posts 13. Furthermore, other forms of post structure such as 15 and 17 could be used in lieu of post 11.

Although the description of the method employed for producing the various embodiments of the present invention has been limited to molding articles from fiber pulp, it will be appreciated that the same structure may be obtained from plastics and other suitable materials by the use of suitably shaped dies. Thus, tabular extensions 29 of the walls 7 and 9 could be formed of plastic by the use of mating male and female dies which come completely together in the areas which are unbridged and define the opening shape adjacent tabular extension 29. Similarly, gusset formation could be obtained between these same molds by providing an inter-connected cavity spacing adequate to receive sufficient plastic material to provide the desired formation.

Although the above described embodiments refer to a relatively high side wall container which may be used in connection with sleeve cover means such as shown in Patent 3,129,866 granted April 21, 1964 or other cover means such as described in my Patent 3,193,177 granted July 6, 1965, it will be equally apparent that the gusset means and associated improved cell wall structure are equally useful in other forms of containers such as that illustrated by the following embodiments. Furthermore, a variety of different shaped pockets and posts in trays may incorporate the gusset means and/or improved cell wall structure of the present invention.

Referring now more particularly to FIGS. 14 through 16 and 18, another egg carton will be described in detail.

As seen in FIG. 14, the carton comprises a body section generally designated by reference numeral 101 and a top cover section generally designated by reference numeral 103. The body section 101 has end walls 105, side walls 107 and a bottom 108 while the top section 103 has end walls 109, side walls 111 and a top panel 112. The top section 103 is hinged to the body section 101 through hinge H.

As further seen in FIG. 14, the body section 101 has article or egg supporting units 113 which extend upwardly from the bottom 108. The egg supporting units 113 may assume many shapes or forms. For the sake of convenience and to show one preferred form of the invention these units will be described as posts and will hereinafter be referred to as posts 113. The posts 113 extend lengthwise of the body section 101 in spaced apart substantially straight lines preferably in three longitudinally extending lines with one line extending substantially along the longitudinal center line of the body section 101 and with the other two lines extending along and immediately adjacent the side walls 107 of the body section 101. The posts extending along the longitudinal center line of the body section 101 except for the endmost posts comprise inwardly projected portions of the bottom 108 and have the shape of truncated cones. The endmost posts 113 which lie immediately adjacent the end walls 105 and those posts lying adjacent and extending along the side walls 107 have the shape of vertically split-in-half truncated cones with the curved portion of the posts 113 facing the interior of the body section 101. These endmost posts 113 and those posts lying adjacent and extending along the side walls 107 comprise inwardly projected portions of the end walls 105 and side walls 107.

As further seen in FIG. 14, the spaced apart posts 113 also lie in substantially straight lines in a direction extending transversely of the body section 101. With this arrangement, every two adjacent posts 113 along the longitudinal center line of the body section 101 cooperate with each opposite and adjacent pair of posts in each line of posts extending along the side walls 107 of the body section 101 to form an egg receiving pocket generally designated by reference numeral 117 for supporting an egg.

The cushioning barrier feature of the invention will now be described. As seen in FIG. 14, a raised rib 121 initiating with and comprising an upwardly projected portion of the bottom 108 connects each post 113 cooperating to form an egg receiving pocket 117. As better seen in FIGS. 16 and 18, of the drawings, the ribs 121 comprise upwardly extending double side walled projections with the side walls identified as 123 and 125. A cushioning tab 127 extends upwardly from the rib 121 forming an integral extension of the wall 123. The tab 127 occupies that area between adjacent eggs which is normally free of egg occupancy and does not effect the position of the eggs when packaged in the carton. In other words, a single thickness of pulp is provided between adjacent eggs at the point of greatest diameter of the eggs to prevent possible contact between and thereby prevent checking of adjacent eggs when the carton is jolted or otherwise disturbed.

The cushioning tab 127 may be formed during the molding operation with the use of a special type molding device which will be explained in detail hereinafter. With the use of this special type molding device, an opening 129 along the upper portion of side wall 125 of the rib 121 is also formed whereby the tab 127 comprises an extension of the side wall 123 of the rib 121.

FIG. 17 shows the empty cartons of FIGS. 14–16 in nested or stacked relationship. As seen in this figure, the cartons may readily and easily be stored in this position.

FIG. 18 shows the packaged eggs E in relationship with the cushioning tabs 127.

FIG. 19 shows a further embodiment of the rib 121 and cushioning barrier 127 wherein the rib 121 extends to a height at least corresponding to the point of greatest diameter of the eggs but which has a compacted or pressed together portion 133 along the middle of the top ridge of the rib 121 which portion cradles the eggs E and provides, in effect, a uniform or single thickness of pulp between adjacent eggs at their probable or possible checking areas, as more particularly disclosed in applications S.N. 416,740 filed December 8, 1964 and S.N. 485,966 filed August 2, 1965.

FIG. 20 shows an embodiment of the rib 121 and cushioning tab 127 wherein the double wall structure of the rib 121 at least extends up to the point of greatest diameter of the adjacent eggs E but wherein the central portion of wall 125 has a cut out curved slot to provide an opening 131 which cradles the egg E so that, in effect, a single wall thickness of pulp is provided between the eggs at their possible checking areas.

As shown in FIGS. 14, 16 and 17, the body section 101 has an elongated ledge 140 which is hinged by pulp hinge 141 to front side wall 107 of the bottom section 101. The ledge 140 includes fastener elements 142 which fit through slots 144 extending through the sides of two of the stiffening elements 143 extending along the non-hinged side wall 111 of the cover section 103.

The stiffening elements 143 supplement and lie in vertical alignment with the posts 113 when the top section 103 is folded over in closed position atop the bottom section 101.

The half posts 113 which extend along the front side wall 107 of the body section 101 do not extend upwardly to the height of the posts in the remaining portion of the body section 101. This arrangement accommodates the free end of non-hinged side wall 111 of top covering 103 as well as ledge 140 when each are folded into locked position as shown, for example, in FIG. 18.

The molds for producing the molded carton will now be described.

As illustrated by FIG. 21, a female mold for forming the body section 101 comprises a base portion 150, and vertically extending and spaced apart units supported by the base portion for forming the egg supporting units such as the posts 113 within the carton. The vertically extending units for molding the posts are not known in the drawing since these are well understood by those skilled in the art. The mold 150 further comprises a vertically extending walled projection or rib 152 which tapers inwardly as it extends upwardly from the base portion 150 and which forms the rib 121 and cushioning tab 127. As seen in FIG. 21, an open mesh screening 154 is positioned over and lies adjacent the upper side of the base portion 150 of the mold. In addition, the open mesh screening 154 extends completely over and lies against the A wall or side of the upwardly extending projection 152. On the B wall side of the projection 152, the screening 154 extends over and against only the lower portion thereof. Extending completely through the base portion 150 in spaced apart manner are vacuum passages 156 through which a vacuum is applied in order to draw pulp 158 against the screened portions. As seen in FIG. 21, these vacuum passages 156 lead to the screen portion only and not to the unscreened area along the upper face of the B wall or side of the projection 152.

Conveniently, a screen clamp 162 is provided which is tapered so that it forms a continuous uninterrupted extension of the B wall or side of the projection 152. The clamp 162 fits into a cut-out area 164 along the upper portion of the B wall or side of the projection 152 to clamp the ends of the screening 154 extending from the A side of the projection and the lower face of the B side of the projection 152 firmly in position. To fix the clamp 162 in position, a threading screw may extend through the clamp 162 and into the body of the projection 152, essentially as illustrated in more detail in FIG. 10.

With the above described arrangement the pulp will adhere to all of the screened area but will not adhere to the unscreened area along the upper face of the B side of the projection 152. The construction of the cartons shown in FIGS. 16 and 18 is therefore formed with only a single thickness cushioning tab 127 at the point of the greatest diameter of adjacent eggs.

FIGS. 22 and 23 show a male embodiment of the mold. In this mold, the screening 154 is positioned completely along the underside of the base portion 150 as well as completely and continuously along the underside of a double walled projection 170 for forming the cushioning tab 127. With this arrangement, vacuum is also applied through passages 156 to draw the pulp 158 against the screening 154. There are no vacuum passages extending along the upper portion of the inner face of the B wall or side of the double walled projection 170, the screening at this point being blocked off as at 172 to provide assurance that pulp will not adhere along the upper portion of the inner face of the B side or wall of the projection 170 whereby a cushioning tab 127 of single thickness as shown in FIGS. 16 and 18 will be formed along the upper portion of the inner surface of the A side or wall of the projection 170.

With the above described mold, a new and novel type egg carton of regulation size may be formed wherein a protective cushioning tab 127 is provided between the point of greatest diameter of adjacent eggs.

Thus, method and apparatus have been disclosed for forming single thickness upstanding partition structure which extends upwardly from the converging upper limits of transverse, double walled rib structure. Additionally, method and apparatus have been disclosed for forming thickened, gusset-like formations at the zone where a pair of convergingly sloping transverse rib walls join with a closely spaced side wall which extends higher than the rib structure. While it is possible to form the upstanding partition or extension structure exclusively, and it is also possible to form the multiple thickness gusset structure exclusively, it has been found convenient in many molded pulp articles such as egg trays to form both such structures contemporaneously. When the upstanding partition structure such as illustrated at 127 in the egg tray illustrated in FIGS. 14–18 occupies the mid-portion of the double walled rib structure, the spacing between the lateral extremities of the partition structure and the adjacent post or side wall structure determines the thickness of the gusset-like formation. For instance, in the FIGS. 14–18 tray, the spacing is illustrated as having an extent which would inherently produce slightly thickened formations where the pair of convergingly sloping rib walls join adjacent the lower lateral margins of the single thickness upstanding structure. However, depending upon the length of time the dies are immersed in the fibrous pulp slurry, upon the quality of the slurry upon the amount of suction applied, and the like thickened formations may be essentially avoided with dimensions as illustrated in FIGS. 14–18. Clearly, when the dimensions are such as illustrated in the egg carton of FIGS. 1–8, the thickening at the areas 39 will be substantial. An example of a commercial carton utilizing both the tab and the gusset features of the present invention is illustrated in FIGS. 8–18 of Patent 3,215,327 granted November 2, 1965. Thus, it is apparent that the quality and quantity of gusset formations may be controlled depending upon the results desired.

Additionally, the boundaries or margins of the upstanding single thickness partition sheet are generally defined by ragged, feathered edge fibrous pulp when produced according to the above described methods and by using the above described apparatus. This is in direct and easily discernible contrast to smoother edges across the thickness of molded pulp sheets established by forming dies, cutting or other such operations. Accordingly, it is advisable to further include a water spray in the general area of the anti-forming zone of the rib wall on which the aperture or opening is to be formed after removal of the die from the slurry. This minimizes ragged edges caused by stray fibers since the water spray causes the stray fibers to flow toward and attach themselves to the pulp layer as the suction draws the water through the pulp.

Obviously many modifications and variations of the present invention are possible in the light of the above teachings. It is therefore, to be understood that within the scope of the appended claims the invention may be practiced otherwise than as specifically described.

What is claimed is:

1. A unitary container integrally molded of fibrous pulp material comprising a plurality of downwardly dished article-receiving pockets each defined at least in part by upwardly and outwardly sloping rib walls, the rib walls between two adjacent pockets converging upwardly with each other to form rib structure separating the adjacent pockets from each other, and an element integrally molded as an extension of the rib structure to form an upstanding cushioning partition for articles and having substantially the same thickness as a single rib wall.

2. The unitary container of claim 1 wherein the cushioning partition element is integrally molded as an extension of one of the rib walls.

3. The unitary container of claim 2 wherein the rib structure further includes an aperture through the other of the rib walls which essentially underlies the element.

4. The unitary container of claim 1 wherein the cushioning partition element is integrally molded as a generally planarly arranged extension of one rib wall, and the rib structure further includes an aperture integrally molded through the other rib wall which essentially underlies the upstanding element.

5. The unitary container of claim 4 wherein the width of the aperture is greater than the width of the cushioning partition element whereby when plural like containers are nested in a stack the element of one container is received in the aperture of the adjacent container.

6. The unitary container of claim 5 wherein the upwardly converging rib walls between two adjacent pockets are integrally bridged together on each side of the upstanding element and the aperture which essentially underlies it.

7. A unitary container integrally molded of fibrous pulp material comprising upwardly and outwardly sloping side and end walls, a plurality of inwardly indented and upwardly tapering partial post formations spaced around the side and end walls of the container to partly define article-receiving pockets, a plurality of upwardly tapering full post formations on the interior of the container to further define the article-receiving pockets, double walled rib structure connected between the post formations to further separate adjacent pockets from each other, the rib structure between two adjacent post formations including bridging means integrally joining the upper extremities of the rib walls to each other and to the adjacent post formation, an element integrally molded as an extension of one of the rib walls to form a cushioning partition for articles upstanding from between the bridging means, and an aperture integrally molded in the other of the rib walls between the bridging means to underlie the upstanding element and form an element-receiving means to facilitate nested stacking of like containers.

8. An integrally molded egg container comprising side walls and end walls connected to each other and to a bottom wall, a plurality of substantially longitudinally and transversely positioned upwardly extending and convergingly sloping pairs of spaced wall members, said pairs of wall members forming rib structure joined to said bottom wall and comprising means together with said bottom wall dividing said container into a plurality of egg receiving pockets, the height of said rib structure being substantially below the height of the point at which planar continuations of the slopes of the interior sides of said wall members would converge, and elements integrally molded as extensions of said rib structure, said elements forming partitions having substantially the same thickness as a rib wall and extending upwardly from the top of said rib structure a substantial distance and to at least the point of maximum diameters of eggs positioned in adjacent pockets to thereby provide cushioning means preventing contact between said eggs.

9. The egg container of claim 8 wherein said rib structure includes integrally molded bridging means joining the ends of the upper extremities of respective pairs of said wall members, the intermediate portions of said extremities being free of such bridging means, and wherein one of said extension elements is integrally molded to one of said walls of each pair at the unbridged portion thereof.

10. The egg container of claim 9 wherein the intermediate portion of the wall member of each pair opposite that including said extension element is of reduced height to define an opening permitting extension element entry of another like egg container placed below in stacked relation.

11. The egg container of claim 8 wherein said extension elements of said rib structure are each extensions of one wall of respective pairs of said rib walls.

12. An integrally molded egg container adapted to firmly support a plurality of eggs in upright position, said container comprising side walls and end walls connected to each other and to a bottom wall, a plurality of parallel rows of hollow spaced posts extending upwardly from and integrally joined to said bottom wall, a plurality of upwardly extending and convergingly sloping pairs of wall members joined to said bottom wall and connecting adjacent posts one to another to thereby divide said container into a plurality of egg receiving pockets, said pairs of wall members forming rib structure of a height substantially below the height of the point at which planar continuations of the slopes of the interior sides of said wall members would converge, and elements integrally molded as extensions of said rib structure, said elements forming partitions having substantially the same thickness as a rib wall and extending upwardly from the top of said rib structure a substantial distance and to at least the point of maximum diameters between eggs positioned in adjacent pockets to thereby provide cushioning means preventing contact between said eggs.

13. The egg container of claim 12 wherein said rib structure includes integrally molded bridging means joining the ends of the upper extremities of respective pairs of said wall members, the intermediate portions of said extremities being free of such bridging means, and wherein one of said extension elements is integrally molded to one of said walls of each pair at the unbridged portion thereof.

14. The egg container of claim 13 wherein the intermediate portion of the wall member of each pair opposite that including said extension element is of reduced height to define an opening permitting extension element entry of another like egg container placed below in stacked relation.

15. The egg container of claim 12 wherein said extension elements of said rib structure are each extensions of one wall of respective pairs of said rib walls.

16. An integral, die-formed molded pulp article comprising a base portion extending generally transverse to the direction of article-die separation, a pair of opposed side wall portions connected with opposite sides of the base portion and extending upwardly and outwardly therefrom at acute angles to the direction of article-die separation, a transverse partition portion extending across the base portion and including a first and a second rib wall portion each connected between the pair of opposed side wall portions, the rib wall portions also being convergingly acutely angled to the direction of article-die separation and being joined together across their upper portions, the first rib wall portion including an upwardly directed extension integrally formed between and spaced from the side wall portions to substantially increase the height of the partition portion above the joined upper portions of the rib wall portions, the second rib wall portion including an opening therethrough adjacent its upper portion and between and spaced from the side wall portions to underlie the extension of the first rib wall, the extension being characterized by generally continuous and unscored fibrous material matted together in non-calendared, substantially planar sheet form having a relatively ragged and feathered border.

17. A molded pulp container comprising a bottom section having a plurality of article-receiving cells therein comprising a longitudinally extending partition and a plurality of transverse partitions, adjacent walls of adjacent cells being upwardly and outwardly inclined and converging in a saddle-like juncture below the upper margin of said cells, a tab integrally molded as an extension of and substantially the same thickness as one side wall of a pair of the adjacent cells, said tab extending upwardly from a region adjacent said saddle-like juncture and terminating at its upper end adjacent the upper margin of said cells, whereby to prevent lateral shifting of said articles in said pair of adjacent cells and engagement therebetween, said tab being tapered in width from its widest point at the bottom adjacent said saddle-like juncture to a narrower width at the top thereof, the portion of the adjacent walls of said pair of adjacent cells which underlies said tab being of reduced height to define an opening permitting tab entry of another like container placed below in stacked relation.

18. A container molded of pulp material to provide a plurality of integrally molded cells adapted to support individual objects therein, each cell including a bottom wall and a side wall connected with the bottom wall to extend upwardly and outwardly from the bottom wall, two adjacent cells being separated by partition structure extending transversely to and connected at one end with the side wall, the partition structure including a first rib wall connected with the bottom wall of one cell and a second rib wall connected with the bottom wall of the adjacent cell, the first and second rib walls extending upwardly and outwardly from their respective cell bottom walls and converging toward each other to a zone of juncture spaced above the cell bottom walls, the zone of rib wall juncture including a thickened gusset formation of molded pulp closely adjacent the connection of the partition structure with the side wall, the side wall extending at least as high as the upper extremity of the gusset formation, the gusset formation being substantially thicker in a vertical direction than the thickness of the other molded walls, the upper surface of the gusset formation being shaped in cross-sectional view transverse to the partition structure substantially like an inverted U and the lower surface of the gusset formation being shaped in cross-sectional view longitudinally of the partition structure substantially like an upright U whereby the thickest portion of the gusset formation occurs near its center.

19. The container of claim 18 wherein the side wall takes the form of an upwardly tapering half-post.

20. The container of claim 19 wherein the cell partition structure is connected at its other end with a full post positioned internally of the container.

21. The container of claim 20 wherein the thickened gusset formation closely adjacent the half-post is at least three times thicker in a vertical direction than the thickness of the other molded walls.

22. The container of claim 18 wherein the first rib wall includes an upwardly directed and generally planarly aligned element integrally formed as an extension of the rib wall to substantially increase the height of the partition structure above the zone of rib wall juncture and the second rib wall includes an opening therethrough adjacent its upper portion and positioned to vertically underlie the element of the first rib wall, the thickened gusset formation being located between the element and the opening on the one hand and the side wall on the other hand.

23. The container of claim 22 wherein the side wall takes the form of an upwardly tapering half-post.

24. The container of claim 23 wherein the cell partition structure is connected at its other end with a full post positioned internally of the container.

25. A unitary container integrally molded to substantially final form from fibrous pulp material comprising a plurality of downwardly dished article-receiving pockets each defined at least in part by upwardly and outwardly sloping rib walls, the rib walls between two adjacent pockets converging upwardly with each other to form partition structure separating the adjacent pockets from each other, the partition structure including a central element integrally molded as an extension of one rib wall, the other rib wall being of reduced height underlying the extension to define an opening permitting extension entry of another like container placed below in stacked relation, the element being generally planarly arranged to extend upwardly a substantial distance to form a cushioning partition for articles and being characterized by generally continuous and unscored fibrous material matted together in non-calendared sheet form having a relatively ragged and feathered border, bridging means integrally joining the rib walls togther on opposite edges of the extension and opening, the bridging means including a gusset formation substantially thicker in a vertical direction than the thickness of the other molded walls, the upper surface of the gusset formation being shaped in cross-sectional view transverse to the partition structure substantially like an inverted U and the lower surface of the gusset formation being shaped in cross-sectional view longitudinally of the partition structure substantially like an upright U.

References Cited by the Examiner

UNITED STATES PATENTS

| 1,919,028 | 7/1933 | Koppelman | 229—29 |
| 2,844,268 | 7/1958 | Lambert | 217—26.5 |
| 2,936,922 | 5/1960 | Williams | 217—26.5 |
| 2,997,196 | 8/1961 | Emery | 229—2.5 X |
| 3,199,758 | 8/1965 | Reifers | 229—2.5 |
| 3,215,327 | 11/1965 | Crabtree | 229—2.5 |

GEORGE O. RALSTON, *Primary Examiner.*